O. KARCHER.

CLIPPER.

APPLICATION FILED JAN. 2, 1912.

Reissued Aug. 27, 1912.

13,463.

Witnesses

R. F. Kohl

Ruth A. Miller

Inventor

Otto Karcher

By Harry Grosse

Attorney

COLUMBIA PLANOGRAPH CO., WASHINGTON, D. C.

UNITED STATES PATENT OFFICE.

OTTO KARCHER, OF CANTON, OHIO.

CLIPPER.

13,463. Specification of Reissued Letters Patent. Reissued Aug. 27, 1912.

Original No. 1,011,808, dated December 12, 1911, Serial No. 619,367. Application for reissue filed January 2, 1912. Serial No. 669,143.

*To all whom it may concern:*

Be it known that I, OTTO KARCHER, a citizen of the United States, residing at Canton, in the county of Stark and State of Ohio, have invented certain new and useful Improvements in Clippers, of which the following is a specification, reference being had therein to the accompanying drawing.

This invention relates to lawn mowers and has special reference to that class of lawn mowers provided with reciprocating cutting blades.

The invention has for its object to provide an improved lawn mower having reciprocating cutting blades, the lower blade being so constructed and arranged that the blades will be pressed together during their operation so as to effectively operate.

The invention further has for its object to provide a lawn mower having a simple supporting frame.

The invention further has for its object to provide an improved lawn mower constructed with a set of fixed teeth, and a set of reciprocating cutting teeth so constructed and arranged as to operate a shearing action.

Figure 1:
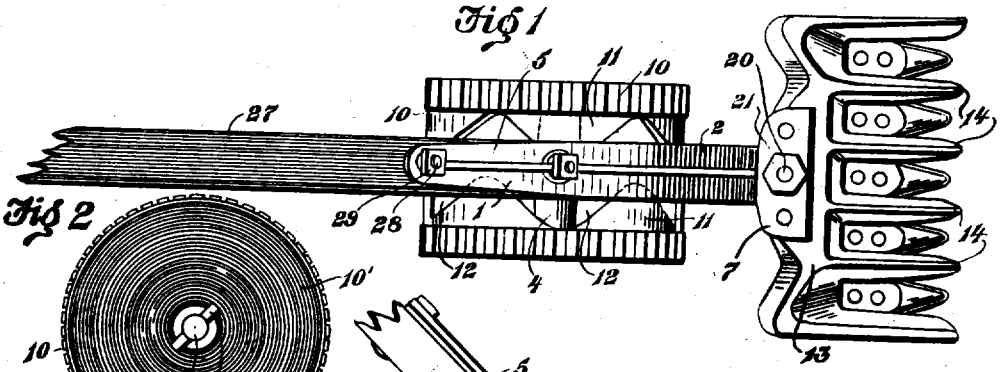
Figure 2:
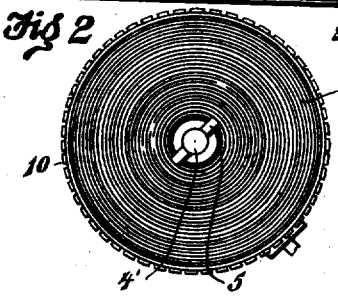
Figure 3:
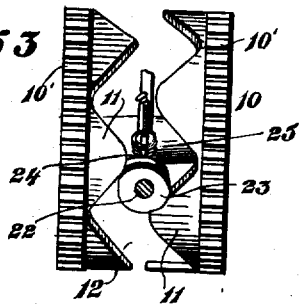
Figure 4:
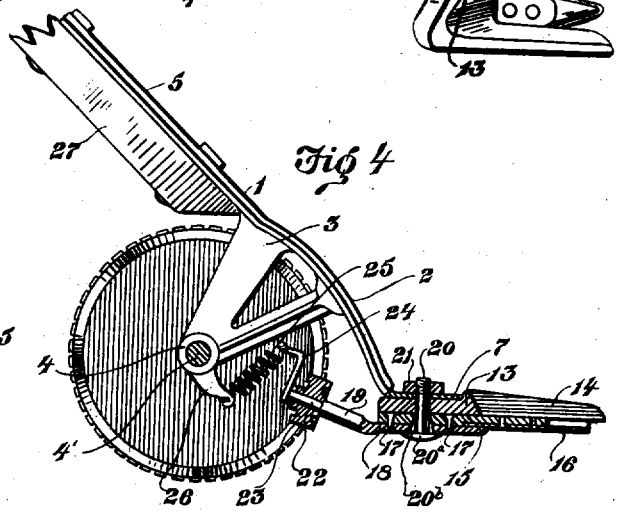
Figure 6:
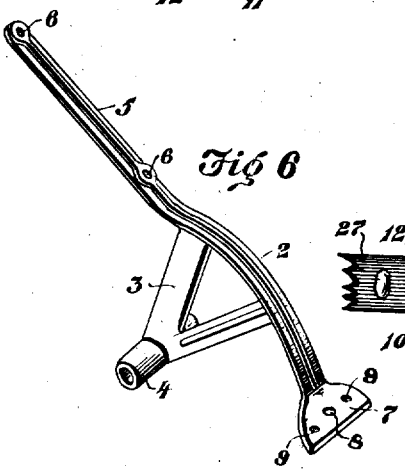
Figure 5:
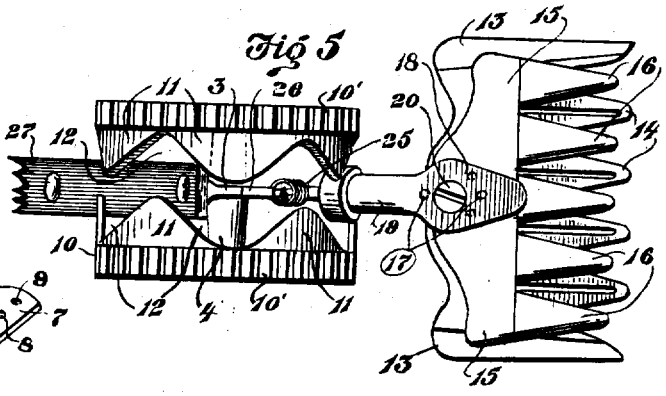

Referring to the accompanying drawings:—Figure 1 is a plan view of a lawn mower constructed in accordance with this invention, the handle thereof being broken away. Fig. 2 is a side view of the roller. Fig. 3 is a front view of the roller. Fig. 4 is a side view in longitudinal section of the lawn mower shown in Fig. 1. Fig. 5 is a plan view of the lawn mower looking at the bottom side thereof. Fig. 6 is a detail view in perspective of the main frame of the lawn mower.

In carrying out the invention a main frame is provided for the lawn mower which consists of a longitudinal bar 1 formed with a curved portion 2 having projecting therefrom a V-shaped bracket 3 and at its apex a tubular bearing 4 projecting therefrom; and a rearwardly extending straight portion 5 provided with reinforced bolt holes 6. The forward end of the curved portion 2 is formed with a laterally projecting plate 7 having a central bolt hole 8 and on each side thereof holes 9 for rivet pins.

10 indicates the usual form of traction wheel, which is formed of two disk shaped portions 10′ each having an inwardly projecting toothed periphery, and having a connecting pivot pin 4′ secured at its ends by a cross pin 5′ and journaled in the tubular bearing 4; the two disk shaped members 10′ of the wheel being spaced apart from each other by the tubular bearing 4 and forming by means of the inwardly projecting teeth 11 a circumferential cam slot 12. A fixed cutting blade 13 provided with tapering teeth 14 is secured to the plate 7 in front of the wheel and to the fixed blade 13 is pivoted a reciprocating cutting blade 15 having tapering teeth 16 which are adapted to oscillate laterally beneath the teeth 14 and normally project between the teeth 14 in a plane below that in which the teeth 14 are located.

The oscillating blade 15 is engaged by dowels 17 to a plate 18 on the end of an arm 19, the plate 18 and the cutting blades 15 and 13 and the plate 7 being connected together by a bolt 20 having the head $20^a$ and nut 21, the plate 13 being firmly riveted to the plate 7 and the blade 15 being pivotally mounted wth the plate 18 on the bolt 20, the blade 15 and the plate 18 being engaged against rotation with respect to each other by the dowels 17.

The pivot apertures $20^b$ in the blade 15 and plate 18 for receiving the shank of the bolt 20, are enlarged, from a round opening at the upper side of the plate 15 to a longitudinally elongated slot at the bottom of the plate 18, which permits a slight vertical oscillation, more particularly of the plate 18, upon the head $20^a$ of the bolt as a fulcrum; so that, when the rear end of the plate is depressed, the forward end of the plate will be pressed upward against the central part of the blade 15 and its teeth 16, thereby pressing the blade with its teeth flatwise throughout their whole extent against the fixed cutting blade 13 and its teeth 14, and insuring a pressing contact between the full extent of the edges of the teeth for the most efficient shearing operation thereof.

The rear end of the arm 19 is formed with a reduced portion 22 on which is mounted a roller 23 located in the circumferential cam slot 12 between the teeth of the roller 10. The inner end of the reduced portion 22 is provided with an angular arm 24 which is connected by a coil spring 25 with an arm 26 projecting from the tubular hub 4. To the portion 5 of the frame is secured a handle 27 by means of bolts 28 projecting through the bolt holes 6 and secured by nuts 29.

When the lawn mower is operated the roller 23 is acted upon by the teeth 11 on the edges of the cam slot in the roller 10, so as to oscillate the arm 19 thereby communicating an oscillating motion to the blade 15 and its cutting teeth 16, the latter having a shearing action with the teeth 14 located above the same. The action of the teeth 11 of the wheel 10 forming the circumferential cam slot 12 is such as to cause the teeth 16 to oscillate past the teeth 14.

The downward rotation of the slot-teeth 11 when the lawn mower is being pushed forward, furthermore tends to depress the cam-roller 23 and thereby the rear end of the plate 18, so that the fulcrum formed by the bolt head 20[a] causes the forward end of the plate 18 to press centrally upward against the blade 15 and its teeth 16; which pressure is increased proportionately to the resistance encountered by the cutting blades in performing their work with the consequently increased lateral and downward pressure of the cam teeth against the cam roller required to oscillate the cutting teeth.

The spring 25 causes a resilient pressure of the teeth 16 against the teeth 14 at all times, and takes up such looseness as there may be in the operating parts when the machine is not being pushed forward. It will be understood that the plate 18 and the arm 19 together constitute an operating arm for oscillating the pivoted blade and pressing it against the fixed blade, and that the spring 25 is not essential to a proper operation of these parts.

It will be noted that by reason of the simple construction of the main frame not only will the weight of the lawn mower be greatly reduced but also the cost of manufacturing will be lessened and the simplicity of the several parts will facilitate the dismantling or putting together of the machine. It is furthermore evident that the frame-bracket 3 constitutes a narrow shank connecting the wheel-bearing 4 with the fixed-blade plate 7, and that the location of this connecting shank in the free annular passage formed between the apices of the cam-slot teeth 11, and the oscillation of the connecting cutting teeth 16 by the single roller 23, located in the cam slot 12, leaves the sides of the traction wheel free of operating or projecting parts and also permits the wheel to be made of less width than the lateral extent of the cutting teeth which enables the teeth to be freely presented to the work, and to be passed freely beyond lateral obstructions.

What I claim is:

1. In a lawn mower of the kind described, a frame, a traction wheel mounted on said frame and having a circumferential cam slot, a fixed cutting blade provided with teeth secured to said frame, an oscillating cutter blade provided with teeth and pivoted to said frame, an arm engaged with said oscillating blade and having a roller located in said circumferential cam slot, and a spring connecting said arm with the roller frame.

2. In a lawn mower of the kind described, a frame consisting of a longitudinal bar having a depending bracket provided with a tubular bearing, a handle secured to said bar, a traction wheel pivoted in said bearing and formed with a circumferential cam slot, cutting teeth secured to one end of said bar, a plate with cutting teeth pivoted to said bar, a rearwardly extending arm engaged with said plate and having a roller thereon mounted in said circumferential cam slot, an angular bracket mounted on the rear end of said arm, and a coil spring connecting said angular bracket with the frame of the machine.

3. In a lawn mower of the kind described, a frame consisting of a longitudinal bar formed with a curved portion having a depending V-shaped frame with a tubular bearing and an arm projecting from said bearing, said bar having a straight portion projecting from one end of its curved portion, a handle secured to said straight portion, said bar being formed with a laterally extending plate at the other end of its curved portion, a plate having cutting teeth fixed to said laterally extending plate at the end of the frame, a plate having cutting teeth pivotally mounted on said laterally extending plate, a roller formed with a circumferential cam slot and mounted on said tubular bearing, an arm engaged with said pivoted cutting plate and having a roller mounted thereon and located in said circumferential cam slot with an annular bracket at the end of said roller arm, and a coil spring connecting said angular arm with the arm of the tubular bearing.

4. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth, an operating arm engaged with the last-mentioned blade to oscillate laterally therewith, a pivot bolt loosely connecting the blades and arm together and forming a fulcrum for the operating arm, one end of the operating arm centrally abutting the oscillating blade, and a roller on the other end of the arm in the cam slot for operating the oscillating blade, whereby a rotation of the wheel in one direction presses the oscillating blade flatwise against the fixed blade.

5. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth operatively connected with the fixed blade, an operating arm engaged with the last-mentioned blade to oscillate laterally therewith, a pivot bolt loosely connecting the blades and arm together and forming a fulcrum for the operating arm, one end of the operating arm centrally abutting the oscillating blade, and a roller on the other end of the arm in the cam slot for operating the oscillating blade, whereby a rotation of the wheel in one direction presses the oscillating blade flatwise against the fixed blade.

6. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth pivoted to the fixed blade, an operating arm loosely pivoted to the frame and engaged with the last-mentioned blade to oscillate laterally threwith, a fulcrum connected with the frame abutting the operating arm, one end of the operating arm centrally abutting the oscillating blade, and a roller on the other end of the arm in the cam slot for operating the oscillating blade, whereby a rotation of the wheel in one direction presses the oscillating blade flatwise against the fixed blade.

7. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth operatively connected with the fixed blade, an operating arm loosely pivoted to the frame and engaged with the last-mentioned blade to oscillate laterally therewith, a fulcrum connected with the frame abutting the operating arm, one end of the operating arm centrally abutting the oscillating blade, and a roller on the other end of the arm in the cam slot for operating the oscillating blade, whereby a rotation of the wheel in one direction presses the oscillating blade flatwise against the fixed blade.

8. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth operatively connected with the fixed blade, and an operating arm loosely pivoted for lateral oscillation and fulcrumed for vertical oscillation on the frame, said operating arm being engaged with and having its forward end centrally abutting the oscillating blade and having a roller on its rear end in the slot, whereby a forward rotation of the wheel presses the oscillating blade flatwise against the fixed blade.

9. A lawn mower including a traction wheel with a pivot pin therein and having a circumferential cam slot, a frame having a bearing mounted on the pivot pin, a fixed blade with cutting teeth on the frame in front of the wheel, an oscillating blade with cutting teeth pivoted to the fixed blade, and an operating arm loosely pivoted for lateral oscillation and fulcrumed for vertical oscillation on the frame, said operating arm being engaged with and having its forward end centrally abutting the oscillating blade and having a roller on its rear end in the slot, whereby a forward rotation of the wheel presses the oscillating blade flatwise against the fixed blade.

10. A lawn mower including a traction wheel with a pivot pin therein and having a circumferential cam slot, a frame having a bearing mounted on the pivot pin with a shank extending freely through the cam slot, a fixed blade with cutting teeth on the frame in front of the wheel, an oscillating blade with cutting teeth operatively connected with the fixed blade, a roller in the cam slot, and operative connections between the roller and the oscillating blade.

OTTO KARCHER.

Witnesses:
RUTH A. MILLER,
FERD J. ZETTLER.

Copies of this patent may be obtained for five cents each, by addressing the "Commissioner of Patents. Washington, D. C."